United States Patent [19]

Lefebvre

[11] Patent Number: 4,825,585
[45] Date of Patent: May 2, 1989

[54] METHOD AND APPARATUS FOR CONNECTING LEADERS TO A FISHING LINE

[76] Inventor: Gérard A. Lefebvre, 271, Corniche des Tamaris - 83500, La-Seyne-Sur-Mer, France

[21] Appl. No.: 187,521
[22] PCT Filed: Aug. 28, 1987
[86] PCT No.: PCT/FR87/00334
 § 371 Date: Apr. 13, 1988
 § 102(e) Date: Apr. 13, 1988
[87] PCT Pub. No.: WO88/01832
 PCT Pub. Date: Mar. 24, 1988

[30] Foreign Application Priority Data

Sep. 12, 1986 [FR] France ............................ 86 12897

[51] Int. Cl.$^4$ ............................................ A01K 95/00
[52] U.S. Cl. ............................................ 43/27.4
[58] Field of Search ............... 43/27.4, 43.12, 42.13

[56] References Cited

U.S. PATENT DOCUMENTS 1,670,185  5/1928  Bond .
2,709,287  5/1955  Shelton et al. .
3,435,552  4/1969  Caldwell .......................... 43/27.4
4,574,516  3/1986  Shedd et al. .................... 43/43.12
4,733,492  3/1988  Thompson ....................... 43/27.4

FOREIGN PATENT DOCUMENTS 0630035  of 0000  European Pat. Off. .
0063035  10/1987  European Pat. Off. .
2152341  of 0000  United Kingdom .
2070901  9/1981  United Kingdom .

Primary Examiner—M. Jordan
Attorney, Agent, or Firm—Balogh, Osann, Kramer, Dvorak, Genova & Traub

[57] ABSTRACT

A device for hauling in or paying out a fishing line carrying leaders fitted with fastenings in the form of pairs of loops through which the master line passes, includes moving leader storage units each comprising firstly a rectilinear tubular guide along the inside of which said master line passes while being hauled in or paid out, and along which the large loops of said fastenings slide either externally or internally, and secondly a rectilinear rail running parallel to said tubular guide and at a distance therefrom which is less than the length of said leaders and over which the hooks fitted to said leaders slide.

14 Claims, 4 Drawing Sheets

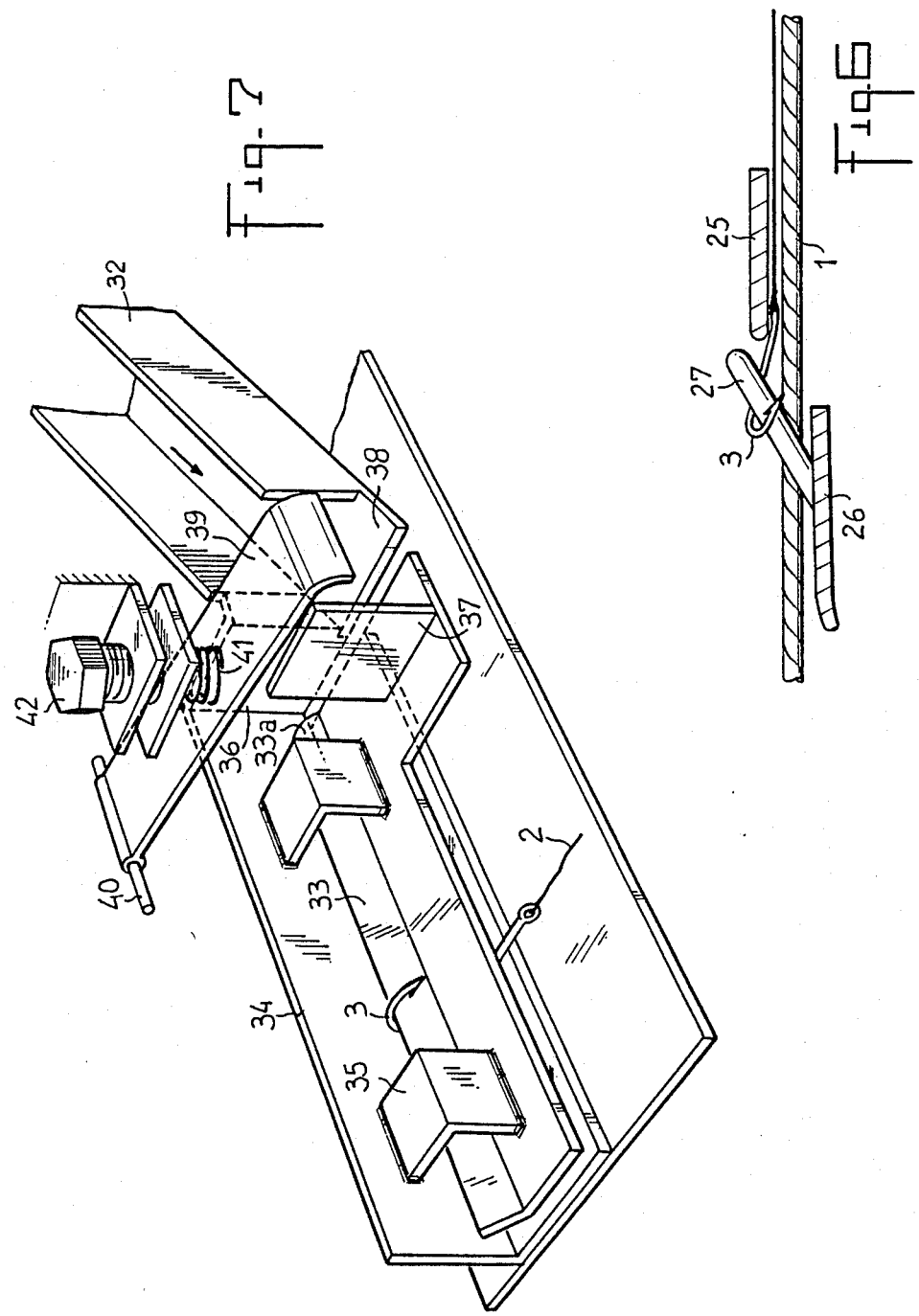

METHOD AND APPARATUS FOR CONNECTING LEADERS TO A FISHING LINE

The present invention relates to a method and an apparatus for connecting leaders to a fishing line and for hauling in or paying out said line.

The technical field of the invention is sea fishing.

Fishing boats at sea often make use of fishing lines referred to as "long lines" which comprise a master line constituted by a strong cord having fixed thereon lengths of line which terminate in fish hooks and which are called "leaders".

Fishing boats are fitted with mechanical means for hauling in lines and generally comprising means for rotating a drum onto which the master line is wound. The presence of the leaders fixed to the master line complicates the operations of mechanically hauling in or paying out the lines since the hooks may tangle or catch.

Various solutions have been proposed.

Instead of being wound onto drums, the lines may be coiled down into baskets with the hooks being hooked to the edges of the basket.

It is also possible to wind the master line onto the drum of a winch while manually removing the leaders.

These traditional solutions greatly slow down the rate at which the operations of hauling in and paying out the lines can take place.

Solutions have also been proposed in which the leaders remain connected to the master line and where the hooks on the leaders are stored on a rail or follow a magnetic track.

French patent application FR-A-2 527 046 (SERN) describes a hauling device including a magnetic guide strip for the hooks leading them to a winding drum where an operator catches hold of them and hooks them in a slot situated around the drum.

Long line type lines present another difficulty, namely the fixing of bait to the hooks.

An object of the present invention is to provide a means of connecting leaders to the master line which enables the leaders to be maintained spread out along the master line during fishing and which also allows the leaders to be disconnected from the master line during the operations of hauling in or paying out so as to make it possible to wind the master line alone on a rotated drum or to pay it out from such a drum without being hindered by the presence of the hooks.

Another object of the present invention is to provide devices for receiving lines and their leaders and for paying them out at high speed by virtue of an original device for connecting the leaders to the master line which simultaneously makes it possible to obtain automatic fixing of bait on the hooks while the line is being paid out.

The objects of the invention are achieved by a novel method of a method of connecting leaders to a fishing line of the long line type, the method being characterized in that each leader is fixed to the large loop of a connection fastening in the form of two loops which includes a small loop diametrically opposed to the fixing of the leader on the large loops, with a master line carrying abutments being engaged through the fastenings, the transverse dimensions of the abutments being greater than the openings through the small loops such that when the leaders are pulled, the line passes into the small loops which abut against said abutments, it being possible to disconnect the leaders from the master line during the operations of winding in or paying out the master line by causing it to pass through the large loops of said fastenings.

A method in accordance with the invention for mechanically hauling in or paying out a fishing line carrying leaders fitted with connection fastenings each in the form of a pair of loops with the master line passing therethrough is characterized in that the master line is passed inside a rectilinear tubular guide which guides said large loops of said fastenings along the inside or the outside thereof, and the hooks of said leaders are caused to slide along a rectilinear guide rail which extends parallel to said tubular guide.

Apparatus in accordance with the invention for connecting leaders to a long line type of fishing line comprises fastenings in the form of two unequal loops which communicate with each other, with each leader being fixed to the portion of the large loop of a fastening which is opposite to the small loop, and said line being engaged inside said fastenings and carrying abutments regularly spaced apart therealong with the largest transverse dimension of the abutments being greater than the apertures of said small loops.

Apparatus in accordance with the invention for hauling in or paying out a fishing line carrying leaders fitted with fastenings in the form of pairs of loops through which the master line passes, includes moving leader storage units each comprising firstly a rectilinear tubular guide along the inside of which said master line passes while being hauled in or paid out, and along which the large loops of said fastenings slide either externally or internally, and secondly a rectilinear rail running parallel to said tubular guide and at a distance therefrom which is less than the length of said leaders and over which the hooks fitted to said leaders slide.

The first result of the invention is novel fastenings enabling the leaders to be connected to a master line without knotting so that it is possible to disconnect them from the master line during the operations of casting the line or of pulling it in and of winding the master line on its own easily onto a drum and then paying it out therefrom while nevertheless allowing leaders to be maintained spaced apart along the line during fishing and avoiding them tangling with one another.

A second result of the invention is that movable units for storing hooks can be interchanged on a work table. While lines are being hauled in, each movable unit placed empty on the table can receive all of the leaders fitted to a line and can then be stored away. When the lines are cast, each movable unit fitted with leaders equipping the line is placed on the work table and facilitates engaging the leaders one by one onto the line as it is paid out, while additionally causing the hooks to pass along a passage where they are automatically baited, thus giving rise to considerably improved rates at which lines can be cast into the water and pulled back out therefrom.

The following description refers to the accompanying drawings which are not limiting in nature and relates to an implementation of apparatus in accordance with the invention.

FIG. 6 is a fragmentary vertical section through FIG. 5.

FIG. 7 is a perspective view of the after end of the work table carrying the device for automatically fixing bait to the hooks.

Figure 1:
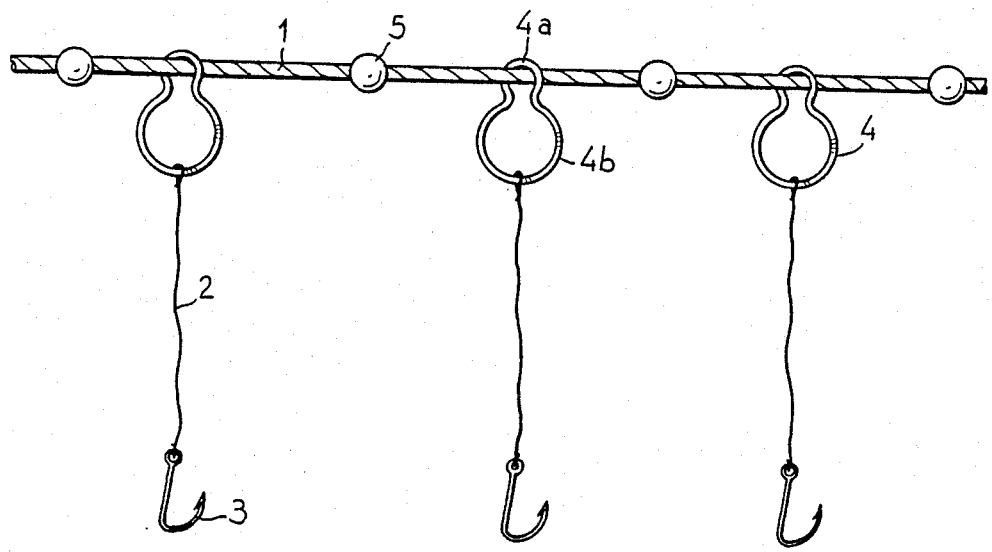
FIG. 1 shows a length of a line.

FIG. 1 shows a preferred embodiment of a fishing line or long line in accordance with the invention. It comprises a master line 1 carrying lengths of line or leaders 2 each of which is fitted with a hook 3.

According to a characteristic of the invention, each leader is connected to the master line via a connection fastening 4 in the form of a pair of loops with the master line 1 passing therethrough.

The master line 1 carries abutments 5 regularly spaced apart therealong. The abutments 5 may be constituted, for example, by knots in the master line, or by beads or by any other equivalent stop means fixed to the master line.

Each connection fastening 4 comprises a small loop 4a whose aperture is smaller than the transverse dimensions of the abutments 5.

Each fastening 4 includes a large loop 4b which communicates with the small loop 4a, and the leaders are fixed to the large loops on the opposite sides thereof to the small loops 4a.

Advantageously, the large loop communicates with the small loop via a throat 4d whose width is slightly less than the thickness of the master line 1, such that it is necessary to apply a small amount of force to cause the master line to pass through the throat.

FIG. 1 shows the positions of the leaders when the line is ready for fishing. The master line is engaged in the small loops 4a of the leaders and cannot move into the large loops because of the throats. If a leader tends to move along the master line, the small loop 4a of its fastening will encounter one of the abutments 5 and each leader is thus maintained between two abutments.

Figure 2:
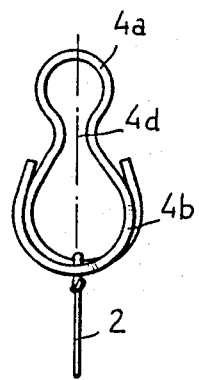
FIGS. 2 and 3 show two embodiments of fastenings in accordance with the invention.

FIG. 2 shows a first embodiment of a fastening according to the invention in which the large loop 4b comprises two loops which are superposed like a split key-ring and the leader is fixed to the fastening by a knot so as to ensure that it remains on the opposite side to the small loop.

Figure 3:
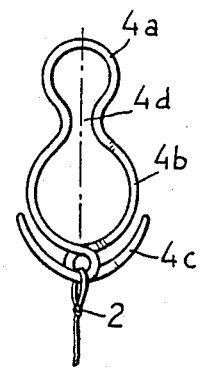

FIG. 3 shows another embodiment in which the large loop 4b is constituted by the two ends of a resilient metal wire, which ends are curved and superposed in such a manner as to delimit a small loop 4c which can be threaded into a loop at the end of a leader 2.

Figure 4:
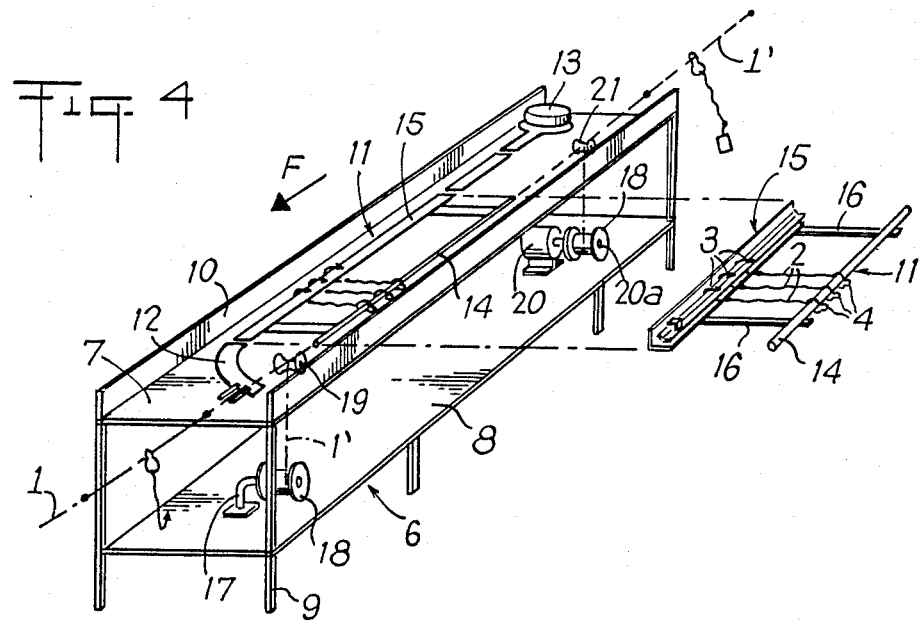
FIG. 4 is an overall perspective view of a work table in accordance with the invention and installed on the deck of a fishing boat.

FIG. 4 is a perspective view of apparatus in accordance with the invention for hauling in or paying out long lines. The apparatus comprises an elongate frame 6 which is installed on the deck of a fishing boat and which extends parallel to the longitudinal axis of the boat. The direction of boat movement is indicated by arrow F. The frame 6 comprises, for example, a top table 7 or one or more lower trays 8 which are fixed to its legs 9.

The two longitudinal edges of the table 7 are fitted with two vertical planks 10 which together with the table 7 delimit a kind of channel.

The table 7 receives successive removable units 11 for storing hooks, with one of the removable units being shown to the right of FIG. 4.

The removable unit is placed on the table 7 and is interposed between a hook guide member 12 situated at the forward end of the movable unit for use when hauling in a line, and a member 13 for fixing bait on the hooks which is used when paying out a line.

FIG. 4 shows a line 1 being hauled in (drawn in dot-dashed lines), and a line 1' being paid out (drawn in dashed lines).

Each unit 11 for storing leaders comprises a rectilinear tubular guide 14 and a rectilinear rail 15 which extend parallel to each other and which are interconnected by crossbars 16.

The distance between the guide 14 and the rail 15 is less than the length of the shortest leader 2.

FIG. 4 shows a plurality of leaders 2 stored on the storage unit 11. In this example, it can be seen that the large loop 4b of the fastenings 4 are engaged around the tubular guide 14 and that the hooks 3 of the leaders slide along the rail 15. Each storage unit 11 can receive a number of leaders corresponding to a single master line.

The lower tray 8 of the frame 6 has paying-out means 17 including a horizontal shaft on which drums 18 are mounted sequentially, with each drum having a master line wound thereon. The drum is allowed to rotate freely on the shaft of the paying-out means.

The table 7 carries a deflection pulley 19 which is situated above the paying-out means 7 and forward of the forward end of the guide tube 14 placed on the table.

In order to pay out a line which is wound on a drum 18 and to fit the line with leaders, the fisherman begins by placing a removable unit 11 flat on the table 7, said unit being fitted with a number of leaders that corresponds to the equipment required by the line, with the fastenings 4 being engaged on the tube 14 and the hooks 3 on the rail 15 of the storage unit. The fisherman places a drum 8 on the shaft of the pay-out means 17 and passes the end of the master line over the pulley 19 and then along the inside of the tubular guide 14 and connects the end of the line to a weight or a flag which is cast into the water over the stern of the boat. The master line is dragged into the water by the effect of the speed of the boat which is advancing slowly.

The fisherman causes the leaders to slide one-by-one sternwards until the fastening 4 on each leader comes off the after end of the guide 14.

He then engages the small loop of the leader fastening onto the master line and the leader is automatically entrained by an abutment 5 which encounters the small loop 4a of the fastening stop. The leader passes through the device 13 placed at the after end of the rail 11 and in doing so it receives bait which is automatically fixed to the hook.

Once the line has been fully paid out, the fisherman replaces the storage unit 11 with a new unit containing leaders and loads the pay-out means 17 with a new drum 18 fitted with a master line, and the same operations are repeated.

The lower tray 8 of the frame 6 has a small motor at its after end, for example a hydraulic motor, which drives a shaft 20a on which drums 18 may be mounted for winding in master lines when they are being hauled in.

The table 7 has a deflecting pulley 21 which is situated above the shaft 20a and in alignment with the after end of the guide 14.

In order to recover a line, the fisherman begins by placing an empty storage unit 11 on the table 7 and an empty drum 18 on the shaft 20a.

The end of the master line is then passed between two hook-guiding slopes constituting a portion of the guidance device 12 and then into the tubular guide 14, and finally over the pulley 21 with the end of the line being fixed to the drum 18. The motor 20 is started, thereby driving the drum 18 which acts as a winch hauling in the line.

When a leader appears, the guidance device 12 at the forward end of the table 17 automatically guides the hooks towards the guide rail 15.

The fisherman grasps the fastening 4 on the leader and engages the large loop thereof over the tubular guide 14, such that the master line which travels inside the tubular guide 14 is disconnected from the leaders whose fastenings 4 slide over the outside of the tubular guide 14, allowing the master line to be wound without difficulty onto the drum 18.

Figure 5:
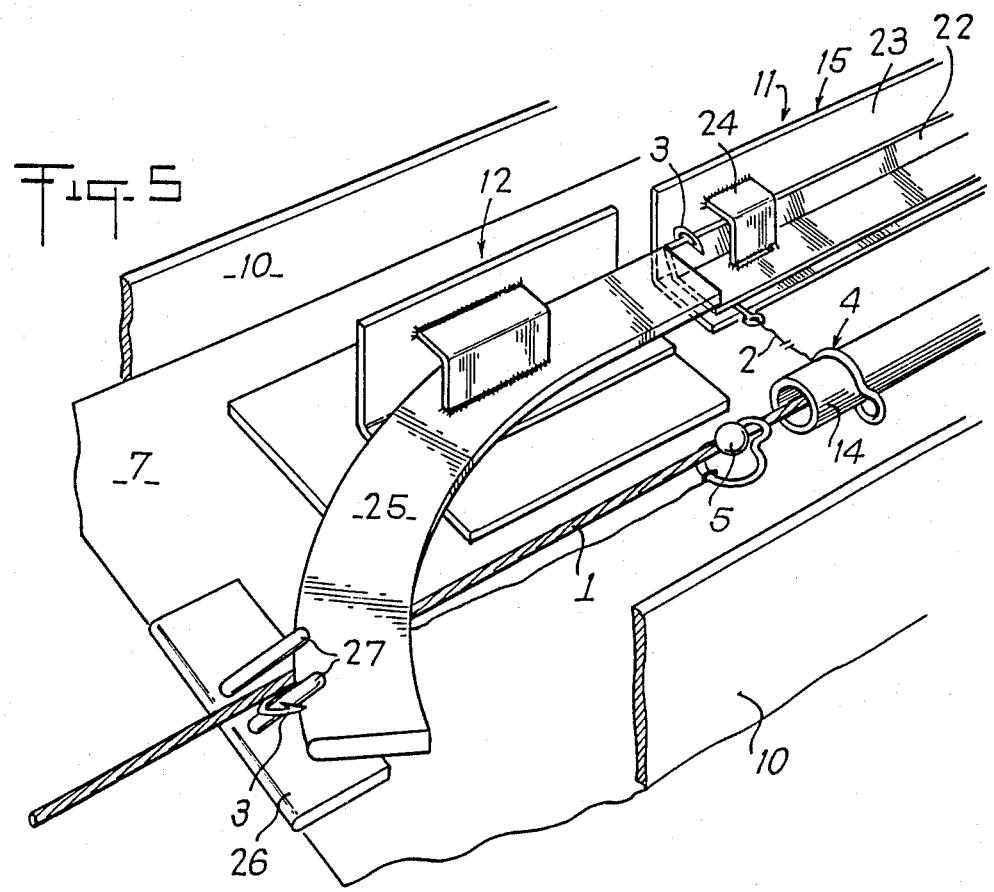
FIG. 5 is a perspective view of the forward end of the work table carrying the hook guide device.

FIGS. 5 and 6 are a perspective view and a fragmentary vertical section through the device 12 for guiding the hooks, which device is fixed to the forward end of the table 7 and to the forward end of the removable device 11 when placed on the table 7.

It can be seen from the figure that the front end of the tubular guide 14 is merely a circular section tube in this embodiment, with the master line 1 passing therethrough while being hauled in. The inside diameter of the tube 14 is greater than the largest transverse dimension of the abutments 5 so that the abutments can pass along the tube 14. It can also be seen from the figure that the cross-section of the rail 15 for guiding the hooks includes, for example, an elongate angle bar 22 having webs of different sizes and at an angle of about 120° to each other.

The rail 15 is held parallel over a second angle bar 23 by lugs 24 which are welded in such a manner that the upstanding web of the bar 22 over which the hooks 3 slide in completely disengaged. The shanks of the hooks 3 slide between the horizontal webs of the two angle bars 22 and 23.

To the right of the figure there is a fastening 4 in the form of two circular loops with the large loop 4b having an inside diameter which is greater than the diameter of the tube 14 so as to enable it to slide over the outside of the tube 14.

The hook guidance device includes a curved rail 25 which may be a bar of stainless steel, for example, and which has a smooth rounded leading edge over which the hooks can slide. The after end of the rail 5 is aligned with the rail 15, and more precisely with the angle bar 22, such that the hooks which escape from the after end of the rail 25 engage on the angle bar 22.

The curved rail 25 crosses the path of the lines 1 which are hauled in beneath the rail.

The guidance device also includes a horizontal plate 26 having a rounded leading edge which is situated beneath the path followed by the lines being hauled in and beneath the curved rail 25, and located ahead of the leading edge thereof.

The plate 26 has two fingers 27 or guide slopes for guiding the hooks and these fingers are situated ahead of the leading edge of the curved rail 25 on either side of the path along which the lines 1 are hauled in, with the fingers sloping sternwardly such that the aftermost ends thereof are situated above the curved rail 25 and aft of the leading edge thereof as can be seen in FIG. 6.

FIG. 5 shows a leader 2 connected to a fastening 4 which is pressed against an abutment 5 such that the leader is drawn by the line and engaged between the two slopes 27. When the hook arrives between the slopes, it hooks onto one of them, slides upwardly along the slope, and on reaching the end of the slope falls off and hooks onto the curved rail 25, and thereafter slides along the leading edge thereof until it is engaged on the angle bar 22. At this moment, the fisherman engages the large loop 4b of the fastening 4 over the tube 14 and the leader is disconnected from the line.

Figure 8:
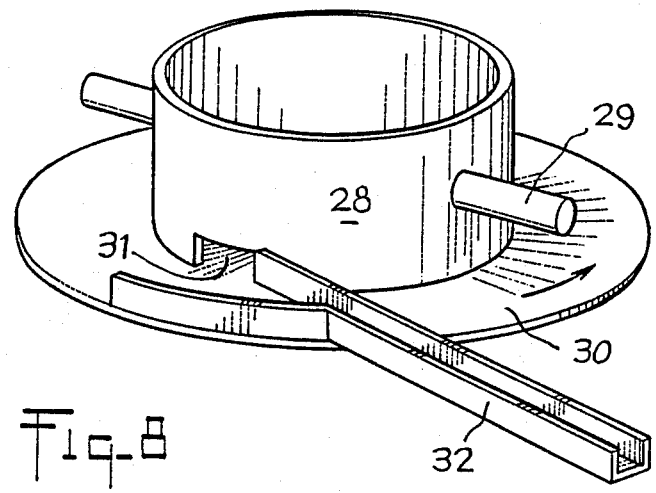
FIG. 8 is a perspective view of the receptacle for dispensing bait.

FIGS. 7 and 8 are perspective views of the device 13 which is placed on the table 7 in alignment with the rail 15 and which serves to automatically fix bait on each hook while the line is being paid out.

FIG. 8 shows the aft portion thereof which comprises a fixed vertical cylindrical receptacle 28 fitted with two fixing lugs 29 and into which chopped bait is placed. The receptacle is disposed above a circular sole plate 30 which is considerably larger in diameter than the outside diameter of the receptacle 28. The sole plate 30 is mounted on a vertical shaft which is rotated in the direction of the arrow by a small motor, for example a hydraulic motor disposed beneath the table 7.

The receptacle 28 has a side opening 31 through which bait can pass, and this opening is situated above the rotating sole plate. In addition, the device includes a U-shaped chute 32 which is flared towards the opening 31 and which receives bait leaving the receptacle, with the bait being urged into the chute 22 under the effect of thrust due to rotation of the sole plate.

Advantageously, the sole plate 30 is placed higher than the table 7 and the chute 32 has a downwards slope.

FIG. 7 is to a larger scale and shows the leading portion of the bait-fixing device.

The leading end of the chute 32 can be seen to the right of the figure and bait arrives in unit portions therealong.

The leading end of the bait-fixing device has two angle bar portions 33 and 34 which are interconnected by right angle lugs 35 and which are disposed immediately aft of the angle bars 22 and 23 and in alignment therewith, such that the hooks 3 sliding along the bar 22 pass onto the bar 33.

The aft end of the vertical web of the bar 34 is extended by a vertical partition 36 which is perpendicular thereto.

The bar 33 is shorter than the bar 34 and its trailing end carries a vertical partition 37 which, together with the partition 36 delimits a transverse passage 38 into which the leading end of the chute 32 opens out.

The top of this passage 38 is closed by a horizontal plate 39 whose far end is hinged about a horizontal shaft 40. The near end of the plate 39 is curved downwardly. The plate 39 is pressed down against the bait by a spring 41 and the compression force is adjustable by means of a knob 42.

The device operates as follows.

When the fisherman is about to put a line into the water, he places a drum 18 carrying the master line 1 onto the pay-out means 17, then engages the line 1 along the tubular guide 14 and casts the end of the line into the water, which end is weighted or fixed to a float carrying a flag. The boat is made to move forward slowly so that the line is paid out.

A removable unit 11 carrying sufficient leaders to equip the line is placed on the table 7.

Each time an abutment 5 leaves the rear end of the tubular guide 14, the fisherman slides the fastening 4 of a leader along the guide tube until it comes off the aft end thereof, and he forces the master line to engage in the small loop 4a of the fastening such that when the next abutment 5 leaves the rear end of the guide tube 14 it entrains the fastening and thus the leader. The hook of the leader engages the rail 33 and slides therealong. When it reaches the trailing end of the trail it escapes therefrom and enters the passage delimited by the partitions 36 and 37 and by the plate 39. It runs along the passage and in so doing it encounters bait to be found therein. The point of the hook penetrates into the bait and the bait engaged on the point of the hook encounters the downwardly curved near end of the plate 39, thereby causing the bait to pivot through a quarter of a turn and engage on the shank of the hook, thus ensuring very good automatic bait fixing on the hooks.

In order to facilitate hook sliding, the trailing edge 33a of the upstanding web of the bar 33 is rounded, as can be seen in FIG. 7.

The trailing edge of the bar 33 is situated between the partitions 36 and 37 and advantageously half-way therebetween, such that the hooks move substantially along the middle of the passage 38 in which they encounter the bait.

Figure 9:
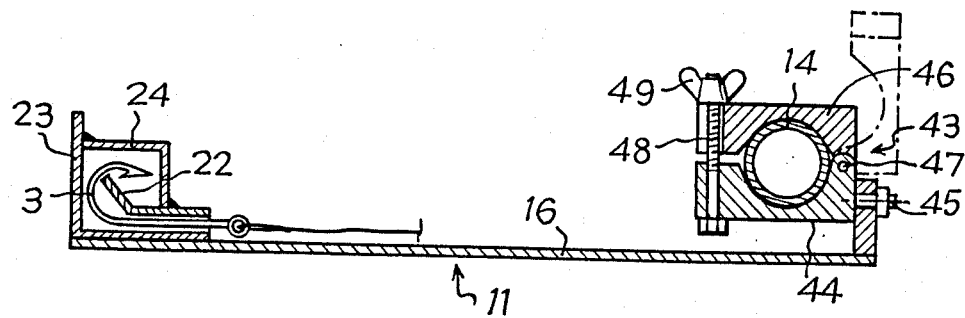
FIG. 9 is a cross-section through a movable unit for storing hooks.

FIG. 9 is a cross-section through a removable unit 11 for storing leaders which pass over one of the cross-bars 16, each of which carries a support 43 for the tubular guide 14.

In this example, the fastenings 4 are in the form of two circular loops and the guide 14 is in the form of a tube over which the large loops of the fastenings can slide. This gives rise to a problem of allowing the fastenings to pass the supports 43. The two supports 43 are situated in the vicinity of the two ends of the tube 14. Each support comprises a bottom jaw 44 which is pivotally mounted about a transverse pin 45, and it includes a top jaw 46 which is pivoted to the bottom jaw 44 about a longitudinal pin 47.

In FIG. 9, the raised position of the top jaw 46 in which the tube is released is shown in dot-dashed lines, and the lowered position of the top jaw 46 in which the tube is fixed to the bottom jaw is shown in solid lines, with the fixing being made secure by a threaded rod 48 and a wing nut 49.

Operation is as follows.

While lines are being hauled in, the support 43 situated at the after end is locked in the closed position, whereas the support 43 at the forward end is open, thereby enabling the leading end of the tube 43 to be raised by pivoting it about the pin 45 of the after support. The fisherman causes the tube to pivot from time to time while engaging fastenings on the leading end of the tube 14 merely by raising the front end thereof, thereby disengaging the tube from the forward support and allowing the fastenings to slide past the forward support and onto the portion of the tube 14 lying between the two supports.

When line is being paid out, the fisherman proceeds the opposite way, i.e. the leading support 43 is locked in the closed position and the rear top jaw is raised. The fisherman in the vicinity of the trailing end of the tube 14 for engaging the fastenings on the master line raises said trailing end of the tube 14 from time to time by pivoting it about the pin 45 of the forward support.

It is not essential for the fastenings to have the double loop shape.

The fastenings may be in the form of two loops whose shapes are square, rectangular, triangular, diamond-shaped, etc.

It is merely preferred and not essential for the large loops of the fastenings to slide over the outside of the tubular guide 14.

Figure 10:
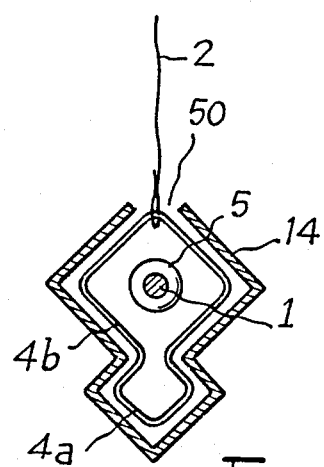
FIGS. 10 and 11 are cross-sections through two variants of implementations of fastening guides.

FIG. 10 is a cross-section through a tubular guide 14 in the form of two slideways each of which is diamond-shaped in section and which fits around fastenings 14 which are likewise in the form of two diamond-shaped loops 4a and 4b, of different sizes and in communication with each other at a common corner, with the leader 2 being fixed to the corner of the large loop located furthest from the small loop. In this case, the fastenings 4 are smaller in cross-section than the tubular guide 14, thereby enabling them to slide along the inside of the guide which holds them laterally. The master line 1 carrying the abutments 5 runs along the largest-section portion of the guide, i.e. inside the large loops 4b, thereby leaving the leaders disengaged from the master line. In this case, the sleeve 14 includes a longitudinal slot through the leaders pass.

The term "tubular guide" is thus used herein to designate either a tube 14 or else a longitudinally split sleeve in the form of two slideways, or else a guide constituted solely by longitudinal rods constituting a cage, with the fastenings being guided either along the inside of the cage or else along the outside thereof.

Figure 11:
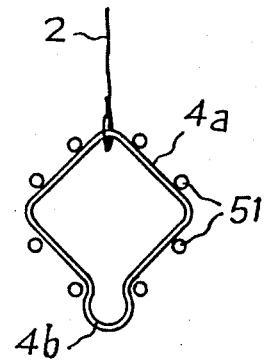

FIG. 11 shows a fastening 4 in the form of a large loop 4a which is rectangular in section and a small loop 4b which is generally circular in section, and a guide which is constituted by eight rods 51 forming a cage inside which the fastenings travel.

The rods 51 are disposed around a line in the form of a double loop which matches the outside contour of the fastenings in this case. However, in a variant, it could fit around the inside contour or it could even lie on two lines, one running along the inside contour and the other along the outside contour of the fastenings.

The lefthand portion of FIG. 9 is a section through the guide rail for the hooks 11 comprising an angle bar 22 having a horizontal web and a sloping web.

It can clearly be seen that the bar 22 is held by the fixing lugs 24 which connect the top of the horizontal web to a fixed support 23 such that the points of the hooks are free to slide along the top edge of the sloping web while the shanks of the hooks 3 are free to slide beneath the horizontal web of the bar 22.

I claim:

1. A method of connecting leaders (2) to a fishing line (1) of the long line type, the method being characterized in that each leader is fixed to the large loop (4b) of a connection fastening (4) in the form of two loops which includes a small loop (4a) diametrically opposed to the fixing of the leader on the large loop, with a master line (1) carrying abutments (5) being engaged through the fastenings (4), the transverse dimensions of the abutments being greater than the openings through the small loops such that when the leaders are pulled, the line passes into the small loops (4a) which abut against said abutments (5), it being possible to disconnect the leaders (2) from the master line (1) during the operations of winding in or paying out the master line by causing it to pass through the large loops (4b) of said fastenings.

2. A method of hauling in or paying out a fishing line (1) carrying leaders (2) fitted with connection fastenings (4) according to claim 1, said line (1) passing through the fastenings, the method being characterized in that the master line is passed inside a rectilinear tubular guide (4) which guides said large loops (4b) of said fastenings along the inside or the outside thereof, and the hooks (3) of said leaders are caused to slide along a rectilinear guide rail (15) which extends parallel to said tubular guide.

3. Apparatus for connecting leaders (2) to a fishing line (1) of the long line type, the apparatus being characterized in that it comprises fastenings (4) in the form of two unequal loops (4a, 4b) which communicate with each other, with each leader being fixed to the portion of the large loop (4b) of a fastening (4) which is opposite to the small loop (4a), and said line (1) being engaged inside said fastenings (4) and carrying abutments (5) regularly spaced apart therealong with the largest transverse dimension of the abutments being greater than the apertures of said small loops (4a).

4. Apparatus for hauling in or paying out a fishing line (1) carrying leaders (2) fitted with fastenings (4) according to claim 1 and in the form of pairs of loops, the apparatus being characterized in that it includes moving leader storage units (11) each comprising firstly a rectilinear tubular guide (14) along the inside of which said master line (1) passes while being hauled in or paid out, and along which the large loops (4b) of said fastenings (4) slide either externally or internally, and secondly a rectilinear rail (15) running parallel to said tubular guide (14) and at a distance therefrom which is less than the length of said leaders (2) and over which the hooks (3) fitted to said leaders slide.

5. Apparatus according to claim 4, characterized in that said tubular guide is a closed tube (14) and the large loops (4b) of said fastenings (4) are circular loops having an inside diameter greater than the outside diameter of said tube, thereby enabling said fastenings to slide over the outside of said tube.

6. Apparatus according to claim 4, characterized in that said tubular guide comprises two sheaths in communication with each other and fitting around the outside shape of said fastenings (4), which fastenings slide along the inside of said sheaths, with said guide including a longitudinal slot (50) through which said leaders (2) pass.

7. Apparatus according to claim 4, characterized in that said tubular guide is a cage formed by longitudinal rods (51) which lie on a line in the form of a pair of loops which fit the internal or external contour of said fastenings (4).

8. Apparatus according to claim 4, characterized in that said hook guide rail (15) comprises a first angle bar (22) having a horizontal web and a sloping web, which angle bar is held by fixing lugs (24) connecting the top of said horizontal web to a support such that the points of the hooks can slide freely along the top edge of the sloping web with the shanks of the hooks sliding freely beneath the horizontal web of said bar (22).

9. Apparatus according the claim 8, characterized in that it includes a table (7) for receiving said movable leader storage units (11), said table carrying a hook guidance device (12) at its forward end, said device comprising a curved rail (25) whose aft end connects to said bar (22) and which curves over the hauling-in path of the lines (1) which pass beneath said curved rail (25), said guidance device (12) further including two guide fingers (27) for guiding the hooks, which fingers are situated forwardly of said curved rail on either side of the hauling-in path of the lines and slope upwardly towards the aft such that their trailing ends are situated over said curved rail (25).

10. Apparatus according to claim 9, characterized in that the aft end of said table (7) carries a device for automatically fixing bait on the hooks, said device being situated aft of said hook guidance rail (15), said device including a transverse passage (38) into which there opens out a chute (32) via which portions of bait arrive one behind the other, said device including a second angle bar (33) situated in alignment with said first bar (22), with the trailing end of said second bar lying substantially in the middle of said transverse passage, said transverse passage being delimited by two vertical partitions (36, 37) and by a top plate (39) whose near edge is downwardly curved and whose far edge is hinged about a longitudinal axis (40), said plate being equipped with a spring (41) urging it downwards.

11. Apparatus according to claim 10, characterized in that it further includes a fixed cylindrical receptacle (28) containing bait chopped into portions, with the bottom of the receptacle being constituted by a rotating sole plate (30), which receptacle includes a side opening (31) situated over said rotating sole plate and leading to said chute (32).

12. Apparatus according to claim 5, characterized in that said tube (14) is held by two supports (43) situated in the vicinity of respective ones of the two ends thereof, with each support comprising a bottom jaw (44) which is pivoted about a transverse horizontal pin (45) and a top jaw (46) which is pivoted to said bottom jaw.

13. Fastenings for connecting leaders (2) to a fishing line (1) of the long line type, the fastenings being characterized in that they comprise two unequal loops (4a, 4b) which communicate with each other via a throat (4d) which is slightly narrower than the diameter of the master line (1).

14. Apparatus according to claim 5, characterized in that said hook guide rail comprises a first angle bar having a horizontal web and a sloping web, which angle bar is held by fixing lugs connecting the top of said horizontal web to a support such that the points of the hooks can slide freely along the top edge of the sloping web with the shanks of the hooks sliding freely beneath the horizontal web of said bar.

* * * * *